(12) United States Patent
Wu et al.

(10) Patent No.: US 11,434,750 B2
(45) Date of Patent: Sep. 6, 2022

(54) DETERMINATION ON CASING AND FORMATION PROPERTIES USING ELECTROMAGNETIC MEASUREMENTS

(71) Applicant: Halliburton Energy Services, Inc., Houston, TX (US)

(72) Inventors: Hsu-Hsiang Wu, Sugar Land, TX (US); Weixin Dong, Sugar Land, TX (US); Jin Ma, Houston, TX (US); Christopher Golla, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 245 days.

(21) Appl. No.: 16/644,137

(22) PCT Filed: Oct. 15, 2018

(86) PCT No.: PCT/US2018/055926
§ 371 (c)(1),
(2) Date: Mar. 3, 2020

(87) PCT Pub. No.: WO2019/083762
PCT Pub. Date: May 2, 2019

(65) Prior Publication Data
US 2020/0240261 A1 Jul. 30, 2020

Related U.S. Application Data

(60) Provisional application No. 62/577,602, filed on Oct. 26, 2017.

(51) Int. Cl.
*E21B 47/092* (2012.01)
*E21B 47/13* (2012.01)
*G01V 3/30* (2006.01)

(52) U.S. Cl.
CPC ............ *E21B 47/092* (2020.05); *E21B 47/13* (2020.05); *G01V 3/30* (2013.01)

(58) Field of Classification Search
CPC ........ E21B 47/09; E21B 47/092; E21B 47/13; E21B 7/10; E21B 43/30; G01V 3/30
See application file for complete search history.

(56) References Cited

U.S. PATENT DOCUMENTS 8,528,381 B2 9/2013 Rodney et al.
8,749,243 B2 6/2014 Bittar et al.
(Continued)

FOREIGN PATENT DOCUMENTS

WO 2014172296 10/2014
WO 2017030575 2/2017
(Continued)

OTHER PUBLICATIONS

ISRWO International Search Report and Written Opinion for PCT/US2018/055926 dated Feb. 25, 2019.

*Primary Examiner* — Caroline N Butcher
(74) *Attorney, Agent, or Firm* — Benjamin Ford; C. Turmey Law Group PLLC

(57) ABSTRACT

A method and system for detecting a conductive member in a formation. The method may comprise disposing an electromagnetic induction tool into a wellbore, transmitting the electromagnetic field from the at least one electromagnetic source, energizing the conductive member in a second wellbore, wherein an eddy current is induced in the conductive member, transmitting a second electromagnetic field from the conductive member, wherein the second electromagnetic field is formed by the eddy current, sensing the second electromagnetic field with the receiver, recording an amplitude of the second electromagnetic field as data, and transmitting the data to an information handling system. A system for detecting a conductive member in a formation (Continued)

may comprise an electromagnetic induction tool. The electromagnetic induction tool may comprise at least one electromagnetic source and at least one receiver. The system may further comprise an information handling system.

18 Claims, 7 Drawing Sheets

(56) References Cited

U.S. PATENT DOCUMENTS

| | | |
|---|---|---|
| 8,844,648 B2 | 9/2014 | Bittar et al. |
| 8,917,094 B2 | 12/2014 | Bittar et al. |
| 9,115,569 B2 | 8/2015 | Tang et al. |
| 9,506,326 B2 | 11/2016 | Hay et al. |
| 9,625,605 B2 | 4/2017 | San Martin et al. |
| 9,752,426 B2 | 9/2017 | Wu |
| 9,874,085 B2 | 1/2018 | Wu et al. |
| 9,879,521 B2 | 1/2018 | Wu et al. |
| 9,903,195 B2 | 2/2018 | Wu et al. |
| 9,958,567 B2 | 5/2018 | Golla et al. |
| 9,963,963 B1 | 5/2018 | Wu et al. |
| 10,001,006 B2 | 6/2018 | Donderici et al. |
| 10,119,389 B2 | 11/2018 | Donderici |
| 10,139,515 B2 | 11/2018 | Golla et al. |
| 10,145,232 B2 | 12/2018 | Wu et al. |
| 10,145,234 B2 | 12/2018 | Bittar et al. |
| 10,227,863 B2 | 3/2019 | Wu et al. |
| 10,273,799 B2 | 4/2019 | Roberson et al. |
| 10,301,926 B2 | 5/2019 | Bittar et al. |
| 10,310,135 B2 | 6/2019 | Wu |
| 10,344,571 B2 | 7/2019 | Wu et al. |
| 10,386,526 B2 | 8/2019 | Wu et al. |
| 10,408,041 B2 | 9/2019 | Wu et al. |
| 10,408,963 B2 | 9/2019 | Wu et al. |
| 10,436,930 B2 | 10/2019 | Wu et al. |
| 10,465,504 B2 | 11/2019 | Gao et al. |
| 10,508,533 B2 | 12/2019 | Wu |
| 10,539,004 B2 | 1/2020 | Wu et al. |
| 10,539,534 B2 | 1/2020 | Amineh et al. |
| 10,557,960 B2 | 2/2020 | Wu et al. |
| 10,563,501 B2 | 2/2020 | Cooley et al. |
| 2013/0193956 A1 | 8/2013 | Yarbro et al. |
| 2015/0338541 A1 | 11/2015 | Nichols et al. |
| 2016/0047224 A1* | 2/2016 | Wilson ................ E21B 43/2406 175/45 |

FOREIGN PATENT DOCUMENTS

| | | | |
|---|---|---|---|
| WO | 2017127060 | 7/2017 | |
| WO | WO-2017127060 A1 * | 7/2017 | ............... G01V 3/30 |

* cited by examiner

DETERMINATION ON CASING AND FORMATION PROPERTIES USING ELECTROMAGNETIC MEASUREMENTS

FIELD

The present disclosure relates to downhole electromagnetic induction tools and, more particularly, to apparatus and methods for detecting conductive members with the electromagnetic induction tool. As disclosed herein, the term "electromagnetic induction tool" denotes any electromagnetic tool which works at least in part based on induction principles. The term "electromagnetic induction tool" is not intended to limit the application to subterranean formation resistivity measurement and specifically includes ranging applications, where a distance and/or direction to a second wellbore may be calculated.

BACKGROUND

In well operations, it may be desirable to survey the formation for secondary wellbores using a downhole tool disposed in the wellbore. One type of downhole tool is an electromagnetic induction tool that may be used to make measurements of the electrical resistivity of earth formations penetrated by a wellbore or make measurements of distance and direction to a second well. Electromagnetic induction tools may be used in logging-while-drilling/measuring-while-drilling operations, electromagnetic ranging, wireline logging, and permanent monitoring systems, among others. Electromagnetic induction tools, or instruments, may typically comprise at least one electromagnetic source and at least one receiver. The electromagnetic source(s) and receiver(s) may be disposed on a tubular, such as a bottom hole assembly, mandrel, or casing joint. The electromagnetic induction tool may be implemented to determine the distance and direction to surrounding wells. Additionally, the electromagnetic induction tool may be disposed in a wellbore for the purpose of investigating electrical properties of subterranean formations and wells adjacent the wellbore. An electrical property of interest may be the electrical conductivity of particular portions of the formation. An alternating current having at least one frequency may be conducted through the electromagnetic source(s). The alternating current may induce eddy current to flow within the surrounding subterranean formations or in adjacent well casings. This eddy current in turn may induce voltages in the receiver(s).

BRIEF DESCRIPTION OF THE DRAWINGS

These drawings illustrate certain aspects of some examples of the present disclosure, and should not be used to limit or define the disclosure.

DETAILED DESCRIPTION

Figure 1:
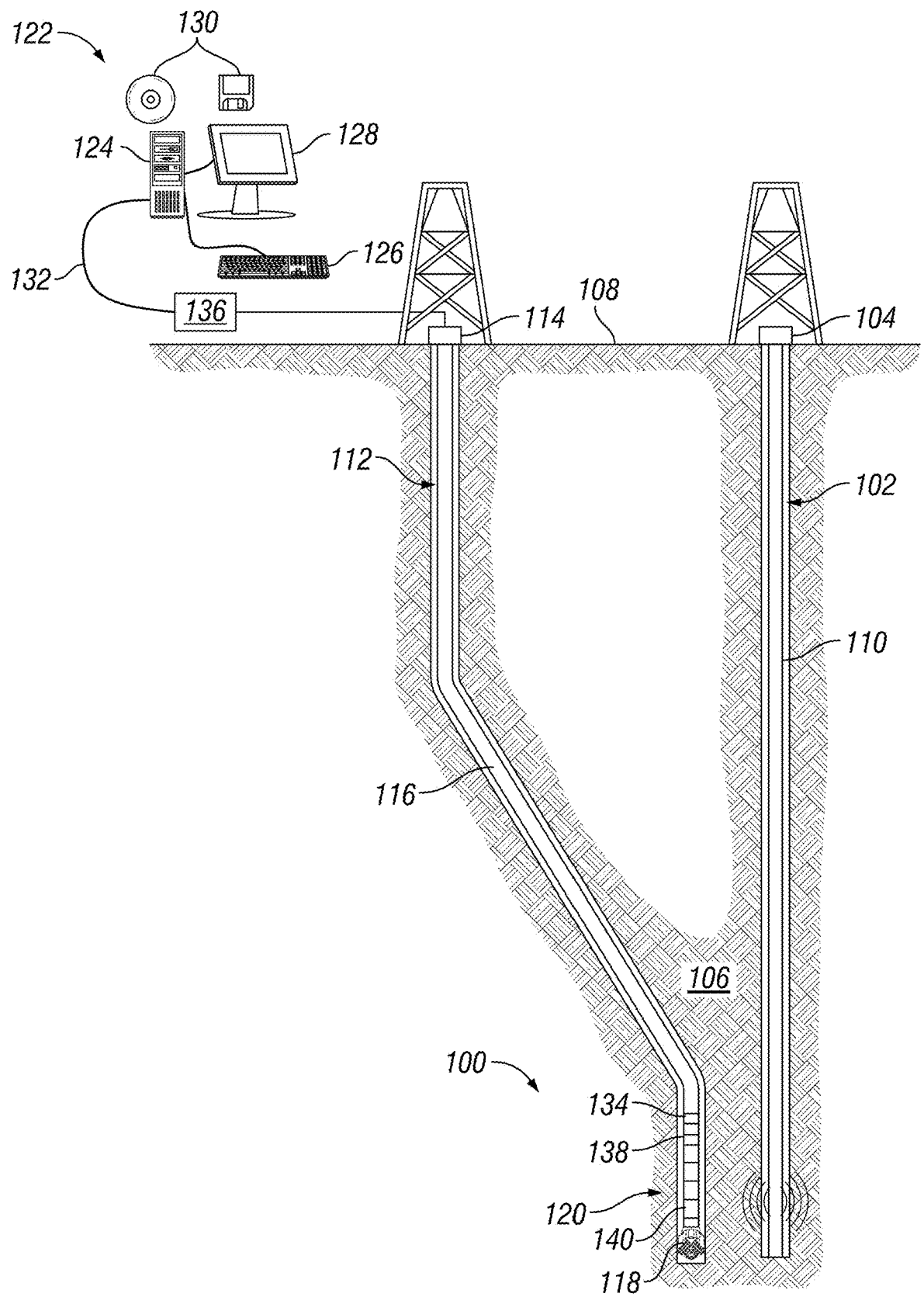
FIG. 1 is a schematic illustration of an electromagnetic induction tool in a wellbore.

This disclosure relates generally to electromagnetic induction tools and, more particularly, to determining in situ and/or during post processing distance and direction to at least one wellbore which may include a conductive tubular member (e.g., a casing). The electromagnetic induction tools may be used in a number of electromagnetic induction tools operations, such as measuring-while-drilling (MWD), logging-while-drilling (LWD), wireline logging, and permanent monitoring operations. Specifically, this disclosure relates to ultra-deep electromagnetic resistivity logging tools detecting other wellbores with conductive tubular members in complex formation. For example, tubulars, which may be conductive, may be disposed within the drill collar on a bottom hole assembly, a wireline tool mandrel, and/or permanently installed production casing. For brevity, the metallic tubular will be referred to as a tubular below. During drilling operations or logging operations it may be beneficial to know the location of other wellbores. When a tubular in a wellbore may be within the detection range of an ultra-deep electromagnetic tool, a sudden signal variation may be seen in measurement. The sudden signal variation may be viewed as an "interrupted formation model" during inversion procession, which may be undesirable because it may be geologically unrealistic. Current technology and operations may disregard and/or remove this data. However, this type of signal change may be used to detect a tubular in another wellbore. This may alert a drilling operator to another wellbore in an oil field. Furthermore, such signals may be used in a robust inversion to determine formation properties & bed-boundary positions, casing properties, and/or locations of tubulars in a wellbore.

Systems and methods of the present disclosure may be implemented, at least in part, with an information handling system. An information handling system may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates an electromagnetic induction tool 100. Specifically, FIG. 1 shows an electromagnetic induction tool 100 for ranging. As illustrated, a first wellbore 102 may extend from a first wellhead 104 into a subterranean formation 106 from a surface 108. Generally, first wellbore 102 may include horizontal, vertical, slanted, curved, and other types of wellbore geometries and orientations. First wellbore. 102 may be cased or uncased. A conductive member 110 may be disposed within first wellbore 102 and may comprise a metallic material that may be conductive and magnetic. By way of example, conductive member 110 may be a casing, liner, tubing, or other elongated steel tubular disposed in first wellbore 102. Determining the position and direction of first wellbore 102 accurately and efficiently may be required in a variety of applications. For example, it may be desired to avoid collision with first wellbore 102 in drilling second wellbore 112 or it may be desired to drill the second wellbore 112 parallel to first wellbore 102, for example, in SAGD applications. In examples, first wellbore 102 may not be accessible and/or information about the position and structure of first wellbore 102 may not be available. Electromagnetic sensor system 100 may be used for determining the location of first wellbore 102, which may be further identified as a "target wellbore" with respect to second wellbore 112.

With continued reference to FIG. 1, second wellbore 112 may also extend from a second wellhead 114 that extends into subterranean formation 106 from surface 108. Generally, second wellbore 112 may include horizontal, vertical, slanted, curved, and other types of wellbore geometries and orientations. Additionally, while first wellbore 102 and second wellbore 112 are illustrated as being land-based, it should be understood that the present techniques may also be applicable in offshore applications. Second wellbore 112 may be cased or uncased. In examples, a drill string 116 may begin at second wellhead 114 and traverse second wellbore 112. A drill bit 118 may be attached to a distal end of drill string 116 and may be driven, for example, either by a downhole motor and/or via rotation of drill string 116 from surface 108. Drill bit 118 may be a part of bottom hole assembly 120 at distal end of drill string 116. While not illustrated, bottom hole assembly 120 may further comprise one or more of a mud motor, power module, steering module, telemetry subassembly, and/or other sensors and instrumentation as will be appreciated by those of ordinary skill in the art. As will be appreciated by those of ordinary skill in the art, bottom hole assembly 120 may be a measurement-while drilling (MWD) or logging-while-drilling (LWD) system.

While FIG. 1 illustrates use of electromagnetic induction tool 100 on drill string 116, it should be understood that electromagnetic induction tool 100 may be alternatively used on any type of conveyance, further discussed below. In examples, electromagnetic induction tool 100 may be used in conjunction with information handling system for determining the distance and direction to first wellbore 102. Systems and methods of the present disclosure may be implemented, at least in part, with information handling system 122. Information handling system 122 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, information handling system 122 may be a personal computer 124, a network storage device, or any other suitable device and may vary in size, shape, performance, functionality, and price. Information handling system 122 may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard 126, a mouse, and a video display 128. Information handling system 122 may also include one or more buses operable to transmit communications between the various hardware components.

Alternatively, systems and methods of the present disclosure may be implemented, at least in part, with non-transitory computer-readable media. Non-transitory computer-readable media 130 may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, information handling system 122 may communicate with electromagnetic induction tool 100 through a communication line 132 disposed in (or on) drill string 116. In examples, wireless communication may be used to transmit information back and forth between information handling system 122 and electromagnetic induction tool 100. Information handling system 122 may transmit information to electromagnetic induction tool 100 and may receive as well as process information recorded by electromagnetic induction tool 100. In addition, electromagnetic induction tool 100 may include a downhole information handling system 134, which may also be disposed on bottom hole assembly 120. Processing may be performed at surface with information handling system 122, downhole with downhole information handling system 134, or both at the surface and downhole. Downhole information handling system 134 may include, but is not limited to, a microprocessor or other suitable circuitry, for estimating, receiving and processing signals received by electromagnetic induction tool 100. Downhole information handling system 134 may further include additional components, such as memory, input/output devices, interfaces, and the like. While not illustrated, bottom hole assembly 120 may include one or more additional components, such as analog-to-digital converter, filter and amplifier, among others, that may be used to process the measurements of electromagnetic induction tool 100 before they may be transmitted to surface 108. Alternatively, raw measurements from electromagnetic induction tool 100 may be transmitted to surface 108.

Any suitable technique may be used for transmitting signals from bottom hole assembly 120 to surface 108, including, but not limited to, wired pipe telemetry, mud-pulse telemetry, acoustic telemetry, and electromagnetic telemetry. While not illustrated, bottom hole assembly 120 may include a telemetry subassembly that may transmit telemetry data to the surface. An electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer 136. Digitizer 136 may supply a digital form of the telemetry signals to information handling system 122 via a communication link 132, which may be a wired or wireless link. The telemetry data may be analyzed and processed by information handling system 122.

In examples, electromagnetic induction tool 100 may comprise an electromagnetic source 138 and/or a receiver 140. It should be noted that electromagnetic induction tool 100 may comprise a plurality of electromagnetic sources 138 and/or a plurality of receivers 140. The plurality of electromagnetic sources 138 and the plurality of receivers 140 may be disposed along a longitudinal axis of the electromagnetic induction tool 100. As disclosed, the concepts that are described herein are valid for any type of electromagnetic source 138 and receiver 140. As an example, wire antenna, toroidal antenna and/or azimuthal button electrodes, transmitter coils, and/or receiver coils may also be used in the place of the electromagnetic source 138 and/or the receiver 140. During operation electromagnetic source 138 may emit an electromagnetic field. The electromagnetic field may energize conductive member 110 of first wellbore 102, which may produce an eddy current within conductive member 110. The eddy current in conductive member 110 may in turn emit a secondary electromagnetic field, which may be sensed, measured, and/or recorded by receiver 140. Information recorded by receiver 140 may be sent to downhole information handling system 134 and/or information handling system 122 disposed on surface 108. The information may be further processed at downhole information handling system 134 and/or information handling system 122.

Any suitable technique may be used for transmitting signals from electromagnetic induction tool 100 to surface 108, including, but not limited to, wired pipe telemetry, mud-pulse telemetry, acoustic telemetry, and electromagnetic telemetry. While not illustrated, bottom hole assembly 120 may include a telemetry subassembly that may transmit telemetry data to the surface. An electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer 136. Digitizer 136 may supply a digital form of the telemetry signals to information handling system 122 via a communication link 133, which may be a wired or wireless link. The telemetry data may be analyzed and processed by information handling system 122. For example, the telemetry data could be processed to determine location of target wellbore 102. With the location of target wellbore 102, a driller could control bottom hole body 120 through geos-steering while drilling second wellbore 112 to intentionally intersect target wellbore 102, avoid target wellbore 102, and/or drill second wellbore 112 in a path parallel to target wellbore 102.

Figure 2:
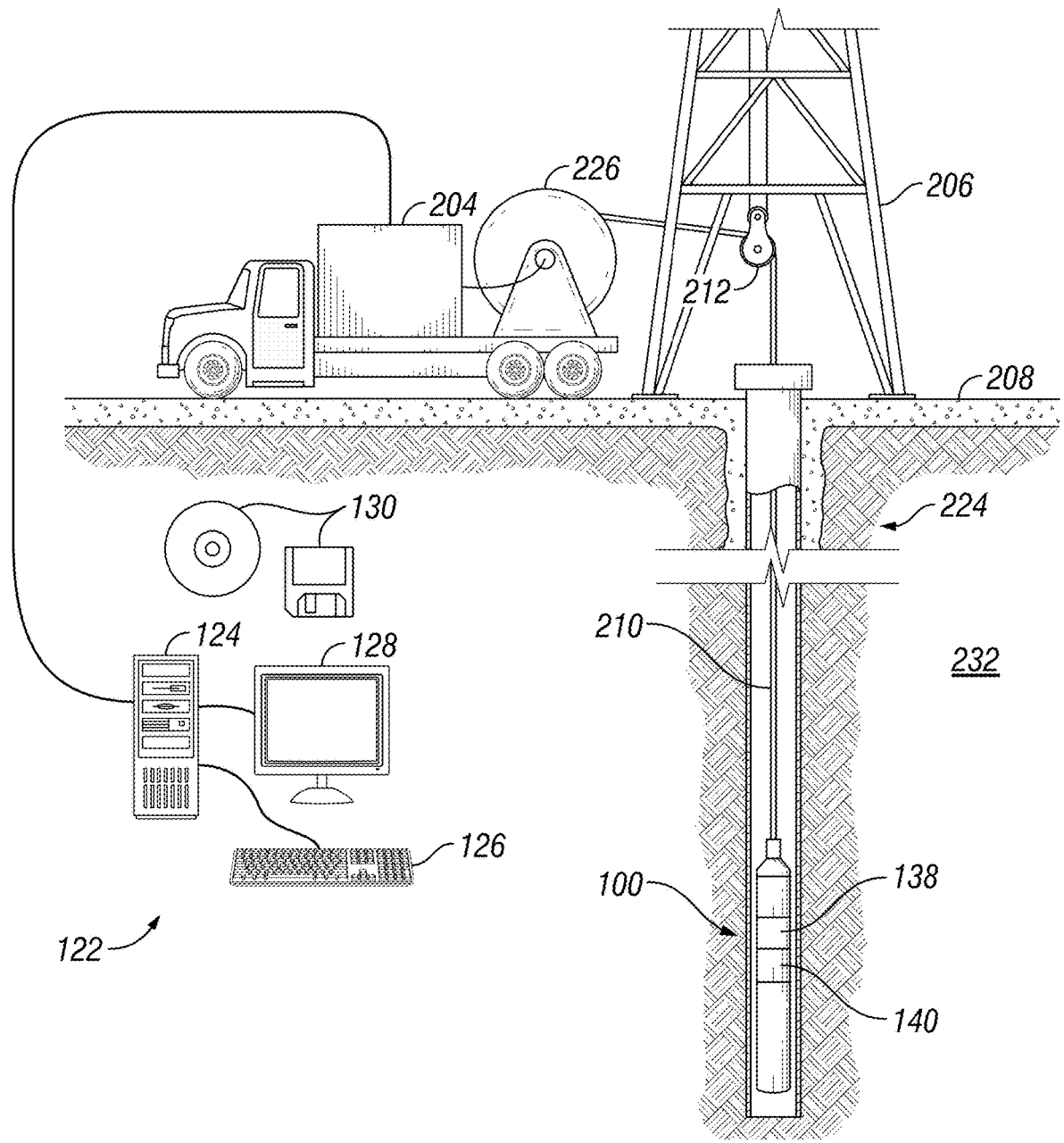
FIG. 2 is another schematic illustration of an electromagnetic induction tool in a wellbore.

FIG. 2 illustrates another example of electromagnetic induction tool 100. As illustrated, electromagnetic induction tool 100 may be attached a vehicle 204. In examples, it should be noted that electromagnetic induction tool 100 may not be attached to a vehicle 204. Electromagnetic induction tool 100 may be supported by rig 206 at surface 208. Electromagnetic induction tool 100 may be tethered to vehicle 204 through conveyance 210. Conveyance 210 may be disposed around one or more sheave wheels 212 to vehicle 204. Conveyance 210 may include any suitable means for providing mechanical conveyance for electromagnetic induction tool 100, including, but not limited to, wireline, slickline, coiled tubing, pipe, drill pipe, downhole tractor, or the like. In some embodiments, conveyance 210 may provide mechanical suspension, as well as electrical connectivity, for electromagnetic induction tool 100. Conveyance 210 may comprise, in some instances, a plurality of electrical conductors extending from vehicle 204. Conveyance 210 may comprise an inner core of seven electrical conductors covered by an insulating wrap. An inner and outer steel armor sheath may be wrapped in a helix in opposite directions around the conductors. The electrical conductors may be used for communicating power and telemetry between vehicle 204 and electromagnetic induction tool 100. Information from electromagnetic induction tool 100 may be gathered and/or processed by information handling system 214. For example, signals recorded by electromagnetic induction tool 100 may be stored on memory and then processed by electromagnetic induction tool 100. The processing may be performed real-time during data acquisition or after recovery of electromagnetic induction tool 100. Processing may alternatively occur downhole or may occur both downhole and at surface. In some embodiments, signals recorded by electromagnetic induction tool 100 may be conducted to information handling system 214 by way of conveyance 210. Information handling system 214 may process the signals, and the information contained therein may be displayed for an operator to observe and stored for future processing and reference. Information handling system 214 may also contain an apparatus for supplying control signals and power to electromagnetic induction tool 100.

Systems and methods of the present disclosure may be implemented, at least in part, with information handling system 122. While shown at surface 208, information handling system 122 may also be located at another location, such as remote from borehole 224. Information handling system 122 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 122 may be a personal computer 124, a network storage device, or any other suitable device and may vary in size, shape, performance, functionality, and price. Information handling system 122 may include random access memory (RAM), one or more processing resources such as a central processing unit (CPU) or hardware or software control logic, ROM, and/or other types of nonvolatile memory. Additional components of the information handling system 122 may include one or more disk drives, one or more network ports for communication with external devices as well as various input and output (I/O) devices, such as a keyboard 126, a mouse, and a video display 128. Information handling system 122 may also include one or more buses operable to transmit communications between the various hardware components. Furthermore, video display 128 may provide an image to a user based on activities performed by personal computer 124. For example, producing images of geological structures created from recorded signals. By way of example, a three-dimensional model of the subsurface structure.

Alternatively, systems and methods of the present disclosure may be implemented, at least in part, with non-transitory computer-readable media 130. Non-transitory computer-readable media 130 may include any instrumentality or aggregation of instrumentalities that may retain data and/or instructions for a period of time. Non-transitory computer-readable media 130 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 206 includes a load cell (not shown) which may determine the amount of pull on conveyance 210 at the surface of borehole 224. Information handling system 214 may comprise a safety valve (not illustrated) which controls the hydraulic pressure that drives drum 226 on vehicle 204 which may reels up and/or release conveyance 210 which may move electromagnetic induction tool 100 up and/or down borehole 224. The safety valve may be adjusted to a pressure such that drum 226 may only impart a small amount of tension to conveyance 210 over and above the tension necessary to retrieve conveyance 210 and/or electromagnetic induction tool 100 from borehole 224. The safety valve is typically set a few hundred pounds above the amount of desired safe pull on conveyance 210 such that once that limit is exceeded, further pull on conveyance 210 may be prevented.

Electromagnetic induction tool 100 may comprise an electromagnetic source 138 and/or a receiver 140. In examples, electromagnetic induction tool 100 may operate with additional equipment (not illustrated, i.e. shakers and equipment for producing shots) on surface 208 and/or disposed in a separate well measurement system (not illustrated) to record measurements and/or values. As discussed above, electromagnetic induction tool 100 during operation may determine the location of first wellbore 102 (e.g., referring to FIG. 1) using electromagnetic field and/or eddy currents During operations, for example, shallow or ultra-deep logging operations, of electromagnetic induction tool 100, a real-time and/or post-processing solutions may be beneficial to operators. Electromagnetic induction tool 100 may be disposed in complex formations, where at least one cased-hole well, such as first wellbore 102 (Referring to FIG. 1), may be disposed nearby. Referring to FIG. 1, first wellbore 102 may be within the detection range of electromagnetic induction tool 100, a sudden signal variation on the deep reading measurements may be recorded. This recorded measurement may cause interrupted formation model from inversion, which is undesirable since it is geological unrealistic. However, this type of signal change may be used to detect conductive member 110 of first wellbore 102, not only for interpreting the inversion results, but also for raising a flag to the geosteering engineer to avoid first wellbore 102 during drilling. Furthermore, such signals may be used in a robust inversion to determine formation properties & bed-boundary positions as well as casing properties and locations.

A casing indicator method may be utilized to detect first wellbore 102 or any number of cased-hole wells surrounding second wellbore 112. The casing indicator method may include three types of signals, which may trigger the casing indicator. The casing indicator method may include an interrupted relative formation bed azimuth from deep electromagnetic measurements, a large fitting error from the measurement signal processing using 1D formation assumption, a large signal difference between x- and y-component of the measurements, and survey profiles in a particular pad to indicate a casing nearby. The casing indicator method may be defined by three signals recorded, measured, and/or observed from multiple frequencies deep electromagnetic measurements and/or one method while drilling near existing wells. The casing indicator method may be utilized in an inversion to decouple formation properties (such as distance to bed boundaries positions, formation horizontal & vertical resistivity, formation dip, etc.) as well as the casing properties and positions of the existing wells nearby. In addition, the inverted casing positions may be further used to correct the survey uncertainty of the drilling well related to the existing wells nearby.

Once the casing indicator may be triggered, a unique inversion may be initialized to further invert both the properties of formation 106 (Referring to FIG. 1) and conductive member 110 as well as the positions of formations 106 and conductive member 110. The unique inversion includes the profile of conductive member 110 in the modeling calculations so that the inversion may be able to determine the final position and/or properties of conductive member 110. The inverted formation properties may compensate for interruption of conductive member 110 in deep electromagnetic measurements. In addition, the inverted conductive member positions related to the drilling well may be packaged at a formation data product and sold or presented to a client, which may include the survey corrections based on the inverted conductive member positions.

The distance-to-bed-boundary inversions may be improved by including signals of conductive member 110 in the inversion. Correction on survey uncertainty is also available owing to independent deep electromagnetic measurements at each logging point. The survey data have accumulated errors, whereas the deep electromagnetic measurements do not have such issue and are truly independent of each measurement position related to the cased-hole wells nearby. Additionally, the casing indicator method may provide additional service base on existing tools hardware and improve the log interpretation with higher confidence for evaluations of formations 106 (Referring to FIG. 1), including formation resistivity determination (Rh and Av), formation dip inversion, formation distance-to-bed-boundary inversion. Additional answer product of survey uncertainty correction may be provided from the inversion.

Figure 3:
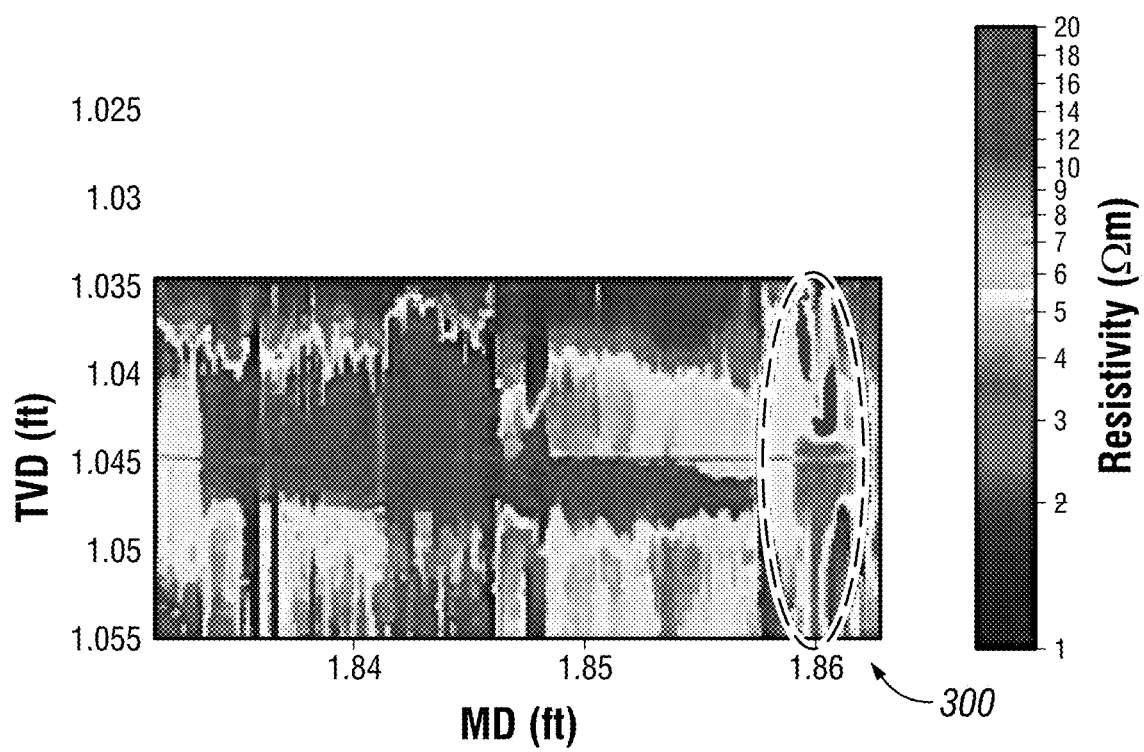
FIG. 3 is a graph of an inverted formation resistivity model.

Acquired during horizontal well drilling through electromagnetic induction tool 100, deep electromagnetic measurements may fed into information handling system 122 and utilized in an inversion calculation. The inversion calculation may assumes a ten layered model, in which the results may be a lowly varying ten layer formation 106 (Referring to FIG. 1) in which boundaries of formation 106 may be continuous. In examples, as illustrated in FIG. 3, the measured inverted boundary has a sudden variation as in the circled area 300, which raises the concern about the inversion accuracy. Analysis shows that this interrupted formation boundary is due to signal changing caused by casing of nearby wells, such as first wellbore 102 (Referring to FIG. 1).

Figure 4:
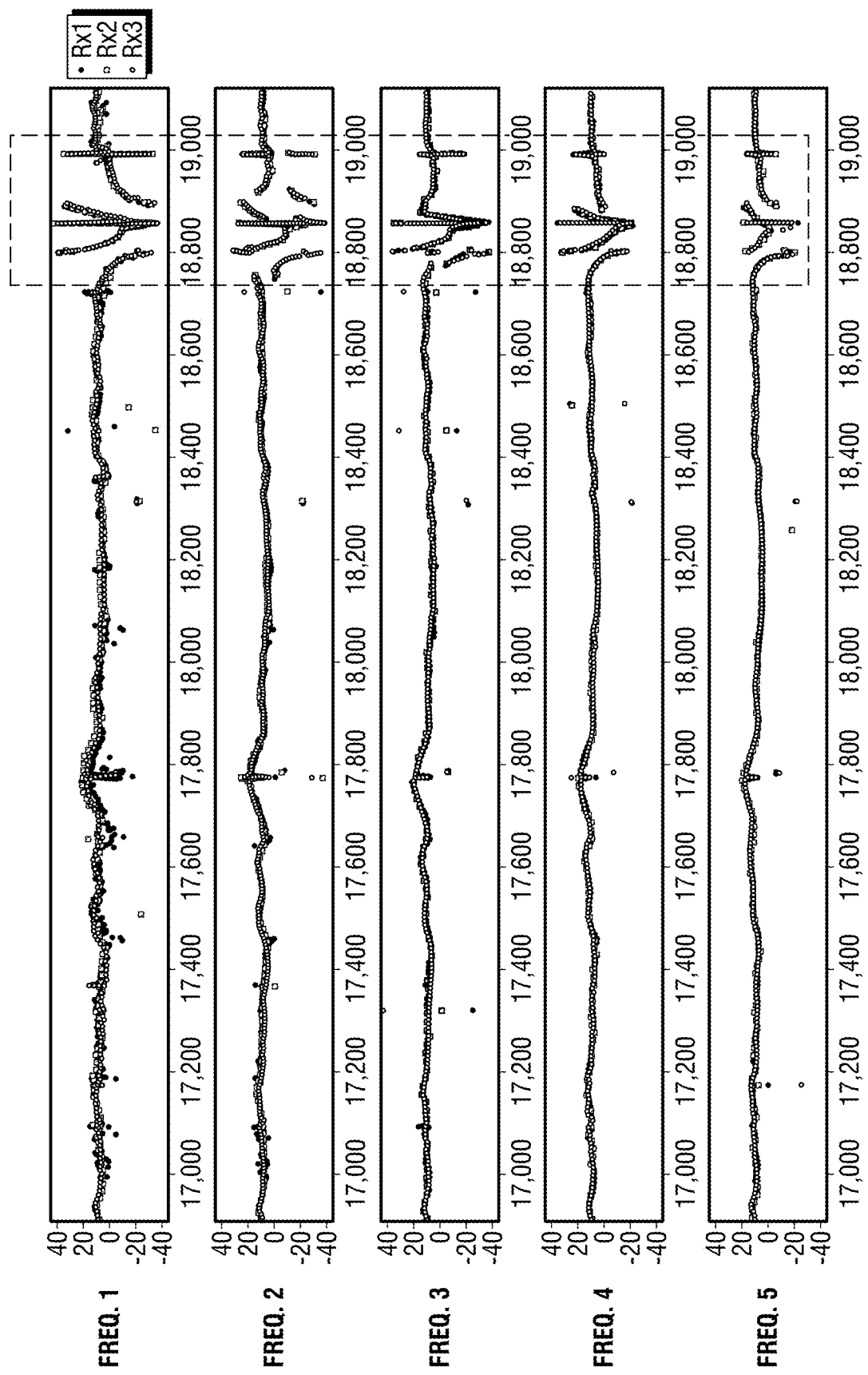
FIG. 4 is a graph of an interrupted relative formation bed azimuth.
Figure 5:
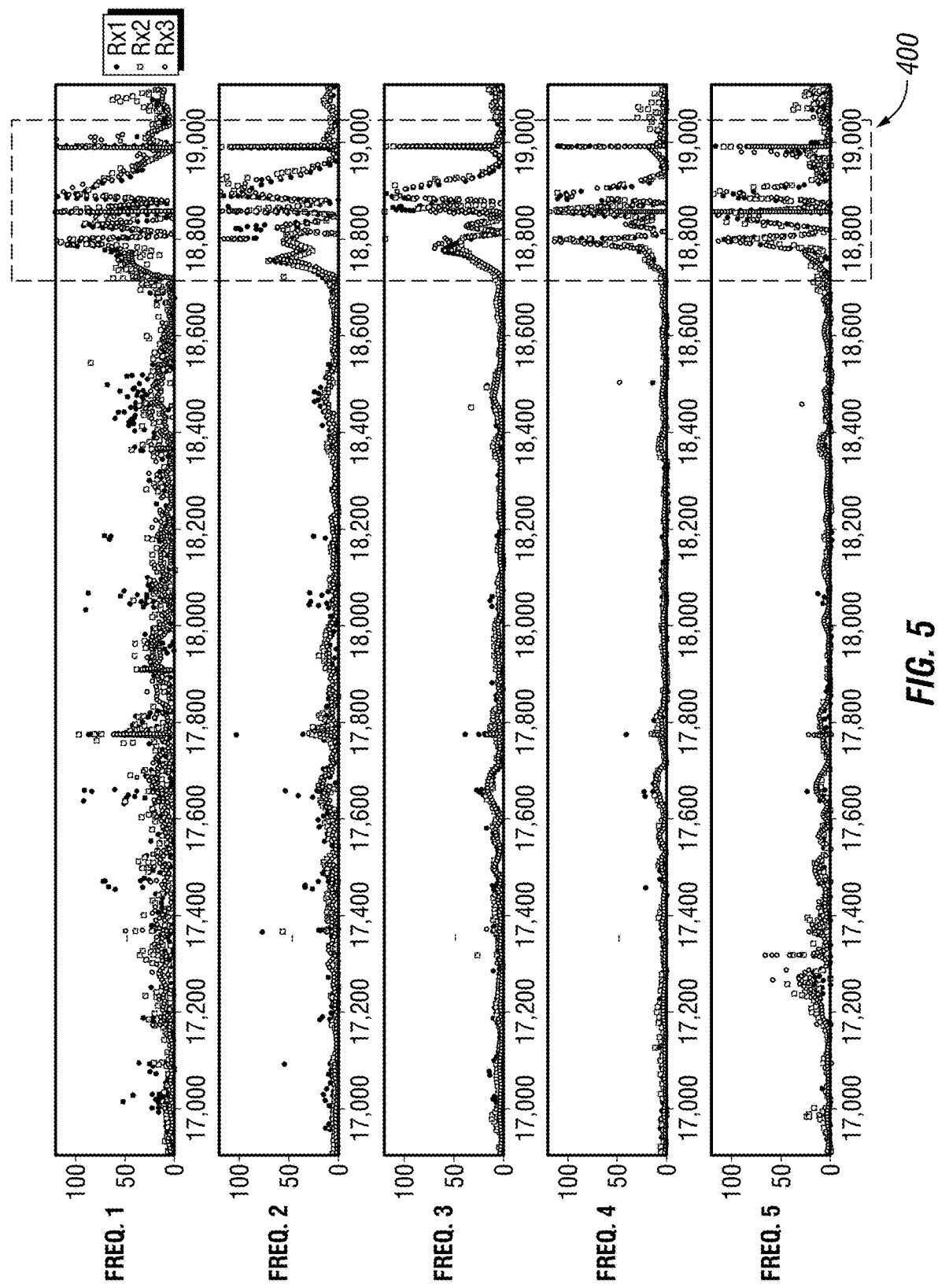
FIG. 5 is a graph of a 1D fitting error in signal processing.

Besides an inversion resistivity curtain plot, three different signals may be used to monitor the effect of conductive member 110. One is the interrupted relative formation bed azimuth as shown in FIG. 4. In a 1D (one dimensions) view of formation 106, as seen in FIG. 3, the azimuth may be constant. Any sudden change in the bed azimuth indicates a 3D effect which may be related to conductive member 110 and this type of change may be observed in signals of multiple frequencies. The second is the large 1D fitting error in the signal processing which may indicate 3D effect as shown in FIG. 5. The identified area 400 in both FIGS. 4 and 5 shows where the deep electromagnetic measurements may affected by the nearby conductive member 112.

Figure 6:
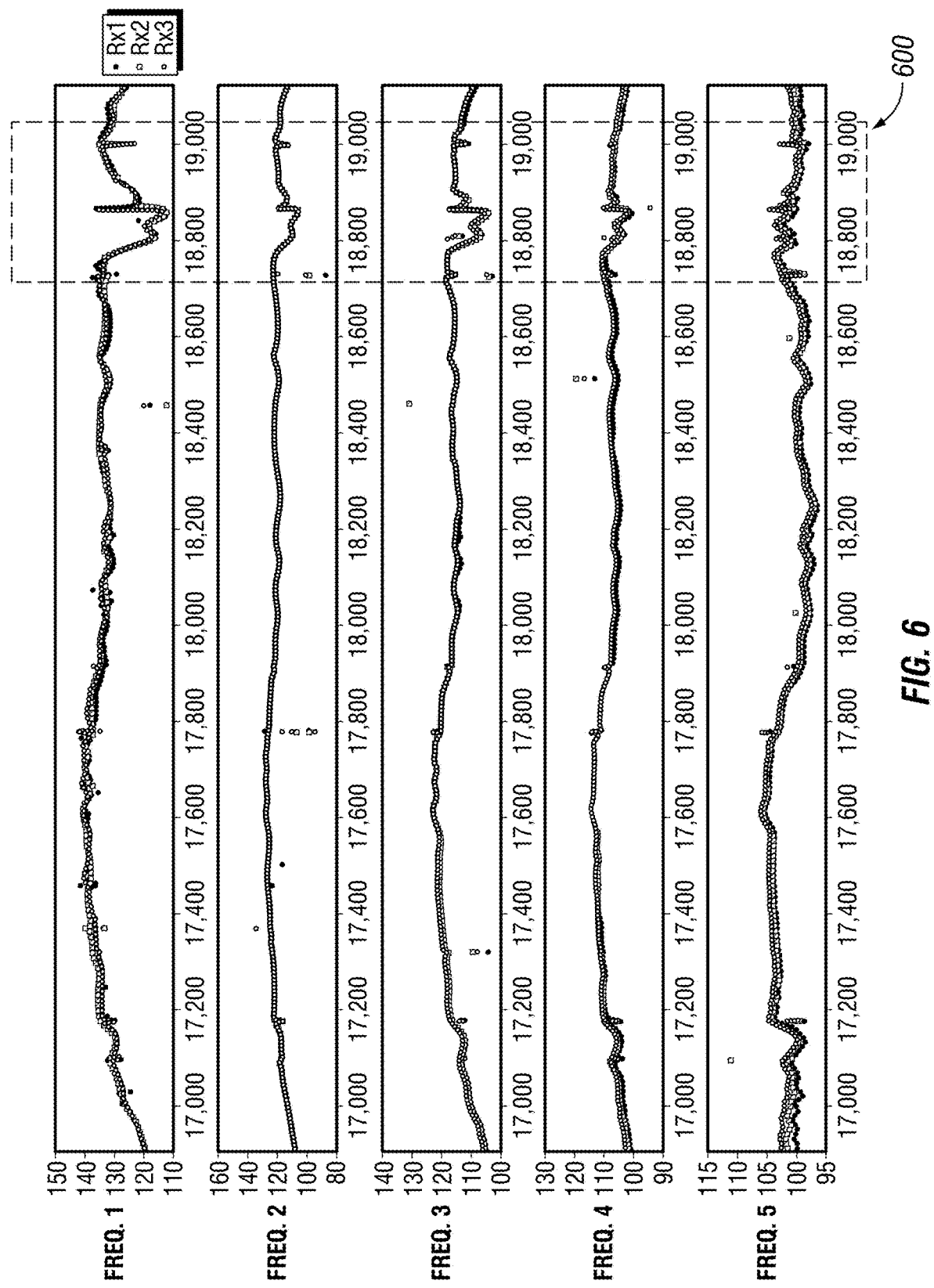
FIG. 6 is a graph of amplitude compared in the XX and YY directions.

Additionally, a nearby conductive member 110 (Referring to FIG. 1) may be identified by a large difference between XX and YY component, as illustrated in FIG. 6. In examples, the induced eddy current in conductive member 110, as discussed above, may form a second electromagnetic field, which may be sensed, measured, and/or recorded by receiver 130. Receiver 130 may measure amplitude of the second electromagnetic field. Components of the second electromagnetic field may be XX and/or YY. It should be noted that the XX measurement may be a measurement along the X-axis and the YY measurement may be a measurement along the Y-axis, relative to receiver 130. The XX or YY measurement may be close to the parallel position to conductive member 110, which may induce a strong signal, while the other signal is perpendicular to conductive member 110, which may induce a weak signal. Using the equation, |XX-YY|, one measurement, the perpendicular measurement, may be about zero. In such a case, the absolute value from the equation may be the parallel measurement. FIG. 6 shows the amplitude of |XX-YY| and the identified area 600 may indicate where electromagnetic induction tool 100 may have measure conductive member 110 nearby. As illustrated, the amplitude is larger than other recorded amplitude. Specifically, large means at least a ten percent increase (positive or negative) from previous measurements.

Figure 7:
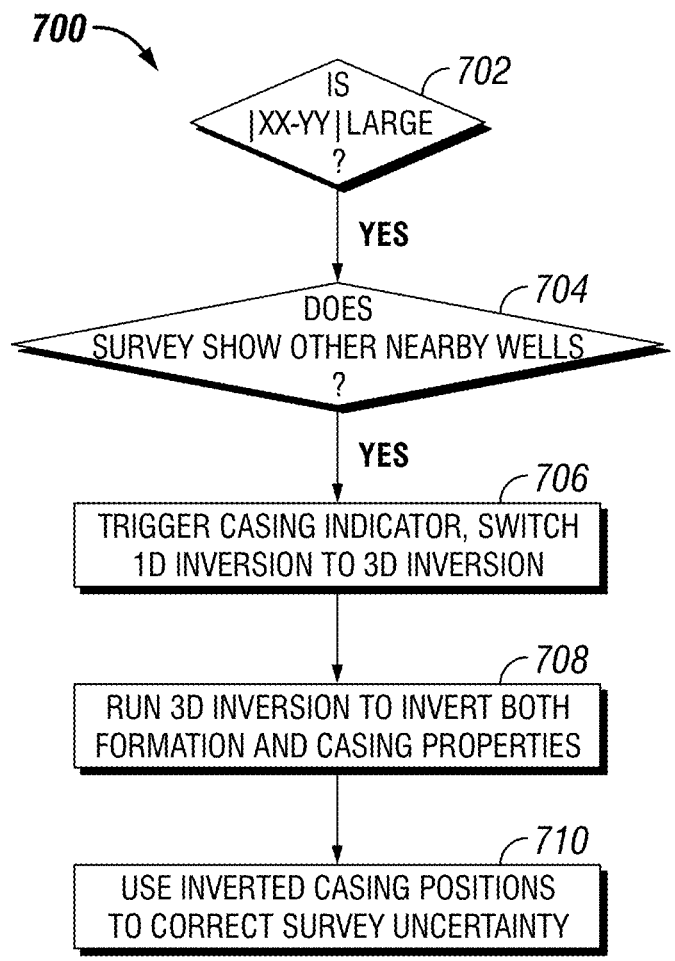
FIG. 7 is a flow chart of conductive member detection using resistivity measurements.

FIG. 7 illustrates conductive member detection method 700. In step 702, the |XX-YY| amplitude obtained to indicate the presence of conductive member 110 (Referring to FIG. 1). If the amplitude is large, then in step 704, the measured signal may be combined with the survey data among multiple wells as the casing indicator, discussed above, which may trigger the casing indicator, step 706. Once the casing indicator is triggered, the 1D deep resistivity inversion may be switched to a 3D inversion. The 3D inversion may include a possible position of conductive member 110 as an initial model before the inversion. Both formation resistivity and resistivity of conductive member 110 may be inverted in the inversion.

In step 706, a thin-wire approximation may be used for resistivity calculation of conductive member 110 (Referring to FIG. 1) to speed up 3D modeling computations. In step 708, the 3D inversion may be utilized to invert both resistivity of formation 106 and/or properties of conductive member 110. In step 710, the inverted position of conductive member 110 may be used to correct the survey uncertainty of the drilling well related to the existing wells, such as first wellbore 102, nearby. The method is not only applicable for deep electromagnetic tools but also for shallow tools.

It should be noted that the methods discussed above may be utilized to further determine the properties of the casing and/or conductive members disposed in second wellbore 112 in which electromagnetic sensor system 100 may be disposed.

Statement 1. A method for detecting a conductive member in a formation may comprise disposing an electromagnetic induction tool into a wellbore. The electromagnetic induction tool may comprise at least one electromagnetic source, wherein the at least one electromagnetic source is configured to emit an electromagnetic field and at least one receiver. The method may further comprise transmitting the electromagnetic field from the at least one electromagnetic source, energizing the conductive member in a second wellbore, wherein an eddy current is induced in the conductive member, transmitting a second electromagnetic field from the conductive member, wherein the second electromagnetic field is formed by the eddy current, sensing the second electromagnetic field with the receiver, recording an amplitude of the second electromagnetic field as data, and transmitting the data to an information handling system.

Statement 2. The method of statement 1, wherein the amplitude comprise an XX signal and an YY signal.

Statement 3. The method of statements 1 or 2, wherein the amplitude is processed using |XX-YY| to determine the presence of the conductive member.

Statement 4. The method of statements 1 to 3, further comprising comparing the amplitude to a survey data, wherein the survey data includes data from at least one other wellbore.

Statement 5. The method of statements 1 to 4, further comprising triggering a casing indicator, wherein the amplitude and the survey data indicate at least one other wellbore is in the oil field.

Statement 6. The method of statements 1 to 5, further comprising switching from a 1D inversion to a 3D inversion and running the 3D inversion to invert a property of a formation or a property of the conductive member.

Statement 7. The method of statements 1 to 6, further comprising updating the survey data with the property of the formation or the property of the conductive member.

Statement 8. The method of statements 1 to 7, wherein the electromagnetic induction tool is disposed on a conveyance.

Statement 9. The method of statements 1 to 8, wherein the electromagnetic induction tool is disposed on a drill string.

Statement 10. The method of statements 1 to 9, further comprising changing directions of the drill string based at least in part on the amplitude.

Statement 11. A system for detecting a conductive member in a formation may comprise an electromagnetic induction tool. The electromagnetic induction tool may comprise at least one electromagnetic source, wherein the at least one electromagnetic source is configured to emit an electromagnetic field, and at least one receiver, wherein the at least one receiver is configured to measure an amplitude of a second electromagnetic field. The system may further comprise an information handling system configured to process the amplitude of the second electromagnetic field using |XX-YY| to find an absolute value of the amplitude, and comparing the absolute value to at least one other measurement recorded by the at least one receiver.

Statement 12. The system of statement 11, wherein the information handling system is further configured to compare a survey data to the absolute value of the amplitude.

Statement 13. The system of statements 11 or 12, wherein the information handling system is further configured to run a 3D inversion to invert a property of a formation or a property of the conductive member.

Statement 14. The system of statements 11 to 13, wherein the information handling system is further configured to update the survey data with the property of the formation or the property of the conductive member.

Statement 15. The system of statements 11 to 14, wherein the electromagnetic induction tool is disposed on a conveyance.

Statement 16. The system of statements 11 to 15, wherein the electromagnetic induction tool is disposed on a drill string.

Statement 17. A method for detecting a conductive member in a formation may comprise measuring an XX and YY of an amplitude from an electromagnetic field with a receiver, using |XX-YY| to find an absolute value of the amplitude, comparing the absolute value to a survey data, triggering a casing indicator, wherein the amplitude and the survey data indicate at least one other wellbore is in the oil field, and switching from a 1D inversion to a 3D inversion and running the 3D inversion to invert a property of a formation or a property of the conductive member.

Statement 18. The method of statement 17, further comprising updating the survey data with the property of the formation or the property of the conductive member Statement 19. The method of statements 17 or 18, wherein the electromagnetic induction tool is disposed on a conveyance.

Statement 20. The method of statement 17 to 19, wherein the electromagnetic induction tool is disposed on a drill string.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for detecting a conductive member in a formation comprising:
    disposing an electromagnetic induction tool into a wellbore, wherein the electromagnetic induction tool comprises:
        at least one electromagnetic source, wherein the at least one electromagnetic source is configured to emit an electromagnetic field; and
        at least one receiver;
    transmitting the electromagnetic field from the at least one electromagnetic source;
    energizing the conductive member in a second wellbore, wherein an eddy current is induced in the conductive member;
    transmitting a second electromagnetic field from the conductive member, wherein the second electromagnetic field is formed by the eddy current;
    sensing the second electromagnetic field with the receiver;
    recording an amplitude of the second electromagnetic field as data, wherein the amplitude comprises an XX signal and an YY signal;
    transmitting the data to an information handling system; and
    processing the amplitude using |XX-YY| to determine the presence of the conductive member.

2. The method of claim 1, further comprising comparing the amplitude to a survey data, wherein the survey data includes data from at least one other wellbore.

3. The method of claim 2, further comprising triggering a casing indicator, wherein the amplitude and the survey data indicate at least one other wellbore is in the oil field.

4. The method of claim 3, further comprising switching from a 1D inversion to a 3D inversion and running the 3D inversion to invert a property of a formation or a property of the conductive member.

5. The method of claim 4, further comprising updating the survey data with the property of the formation or the property of the conductive member.

6. The method of claim 1, wherein the electromagnetic induction tool is disposed on a conveyance.

7. The method of claim 1, wherein the electromagnetic induction tool is disposed on a drill string.

8. The method of claim 7, further comprising changing directions of the drill string based at least in part on the amplitude.

9. A system for detecting a conductive member in a formation comprising:
    an electromagnetic induction tool, wherein the electromagnetic induction tool comprises:
        at least one electromagnetic source, wherein the at least one electromagnetic source is configured to emit an electromagnetic field; and at least one receiver, wherein the at least one receiver is configured to measure an amplitude of a second electromagnetic field; and an information handling system configured to:
  process the amplitude of the second electromagnetic field using |XX-YY| to find an absolute value of the amplitude, and
  comparing the absolute value to at least one other measurement recorded by the at least one receiver.

10. The system of claim 9, wherein the information handling system is further configured to compare a survey data to the absolute value of the amplitude.

11. The system of claim 10, wherein the information handling system is further configured to run a 3D inversion to invert a property of a formation or a property of the conductive member.

12. The system of claim 11, wherein the information handling system is further configured to update the survey data with the property of the formation or the property of the conductive member.

13. The system of claim 9, wherein the electromagnetic induction tool is disposed on a conveyance.

14. The system of claim 9, wherein the electromagnetic induction tool is disposed on a drill string.

15. A method for detecting a conductive member in a formation comprising:
  measuring an XX and YY of an amplitude from an electromagnetic field with a receiver disposed on an electromagnetic induction tool;
  using |XX-YY| to find an absolute value of the amplitude;
  comparing the absolute value to a survey data;
  triggering a casing indicator, wherein the amplitude and the survey data indicate at least one other wellbore is in the oil field; and
  switching from a 1D inversion to a 3D inversion and running the 3D inversion to invert a property of a formation or a property of the conductive member.

16. The method of claim 15, further comprising updating the survey data with the property of the formation or the property of the conductive member.

17. The method of claim 15, wherein the electromagnetic induction tool is disposed on a conveyance.

18. The method of claim 15, wherein the electromagnetic induction tool is disposed on a drill string.

* * * * *